United States Patent [19]

Matsuki

[11] Patent Number: 4,577,246
[45] Date of Patent: Mar. 18, 1986

[54] CASSETTE RECORDING/REPRODUCING APPARATUS WITH AN AUTOMATIC LOADING FEED ROLLER

[75] Inventor: Seiichiro Matsuki, Kawagoe, Japan

[73] Assignee: Pioneer Electronic Corporation, Tokyo, Japan

[21] Appl. No.: 488,659

[22] Filed: Apr. 26, 1983

[30] Foreign Application Priority Data

Apr. 30, 1982 [JP] Japan ................................. 57-72811
Aug. 6, 1982 [JP] Japan ........................... 57-118824[U]

[51] Int. Cl.$^4$ ............................................. G11B 15/00
[52] U.S. Cl. .................................... 360/96.5; 360/93; 242/198
[58] Field of Search .................... 360/93, 90, 92, 96.1, 360/96.2, 96.3, 96.4, 96.5; 242/198, 199

[56] References Cited

U.S. PATENT DOCUMENTS 4,308,562 12/1981 Negishi .................................. 360/93
4,361,859 11/1982 Schatteman ........................... 360/93
4,434,444 2/1984 Sato ..................................... 360/96.5

Primary Examiner—Stuart N. Hecker
Assistant Examiner—Andrew L. Sniezek

[57] ABSTRACT

A cassette tape recording/reproducing apparatus of the automatic cassette loading type wherein a cassette casing inserted into a cassette inlet of the apparatus is automatically rested on reel bases. A frictional feed roller is disposed adjacent the cassette inlet and adapted to be forced down by the cassette casing being inserted. A drive for imparting a rotational force to the feed roller includes a motor and a gear train interconnecting the motor to the feed roller. A control element responds to the forcing down of the feed roller to actuate the motor to rotate the feed roller, thereby frictionally carrying the cassette casing into the interior of the apparatus. A pair of loading and unloading plates pivoted on a shaft serves to move down the cassette casing which has been carried in place by the feed roller, thereby resting the cassette casing on the reel bases in mating relationship. The gear train selectively interconnects the motor to the feed roller and to one of the reel bases, and in response to the resting of the cassette casing on the reel bases, the motor is disconnected from the feed roller and concurrently interconnected to one of the reel bases through the gear train.

25 Claims, 12 Drawing Figures

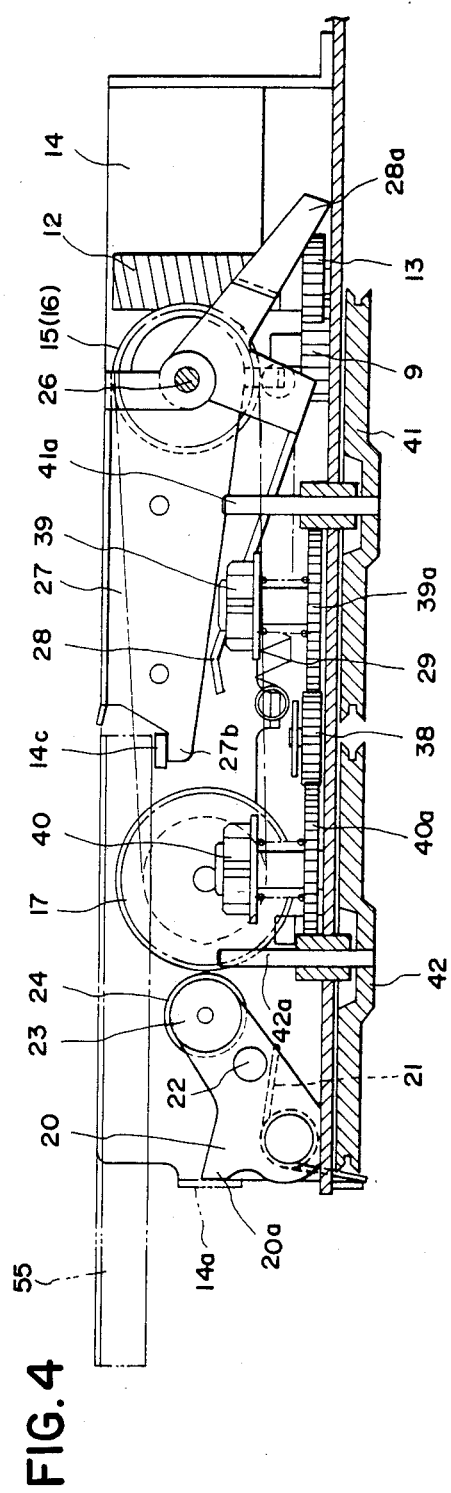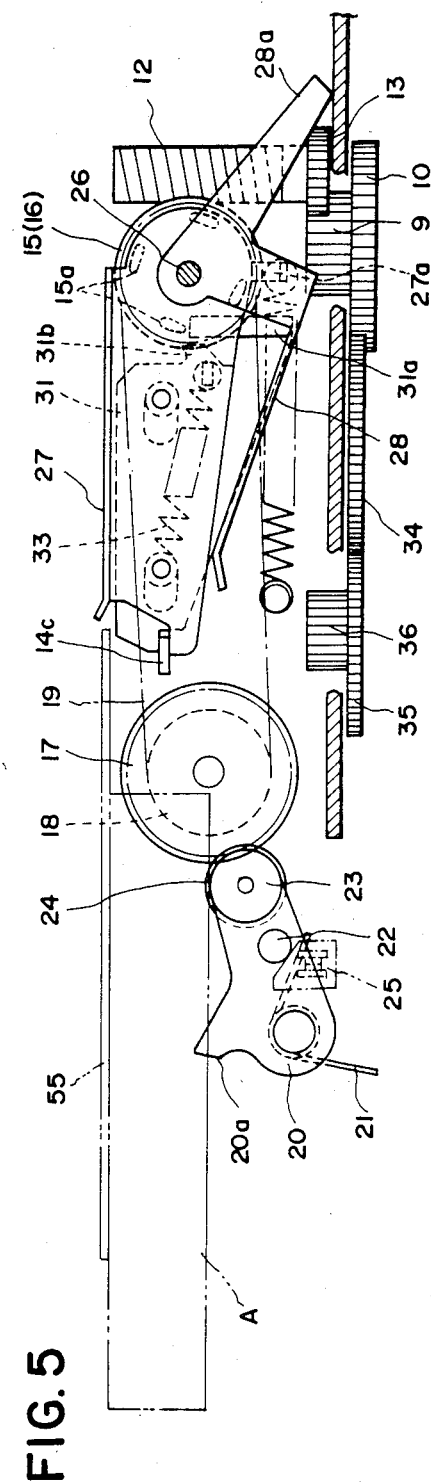

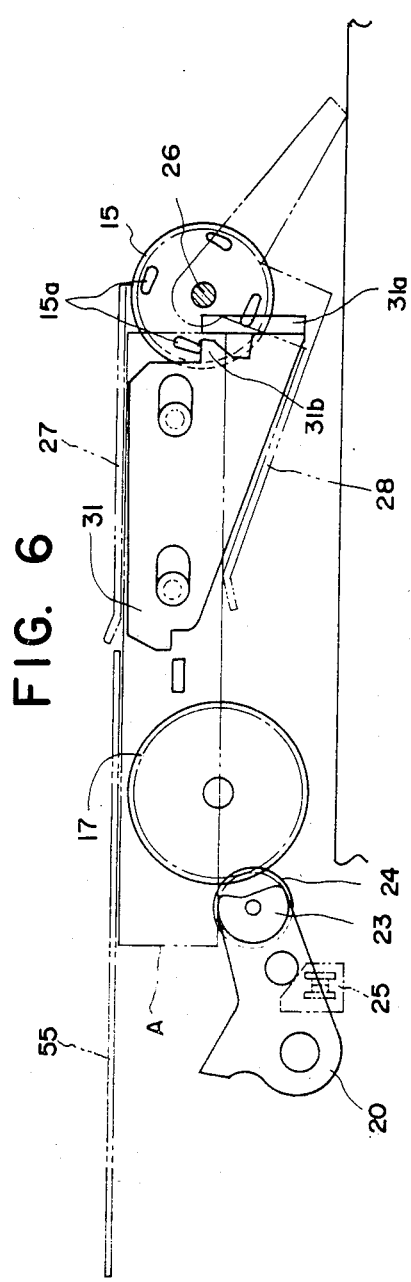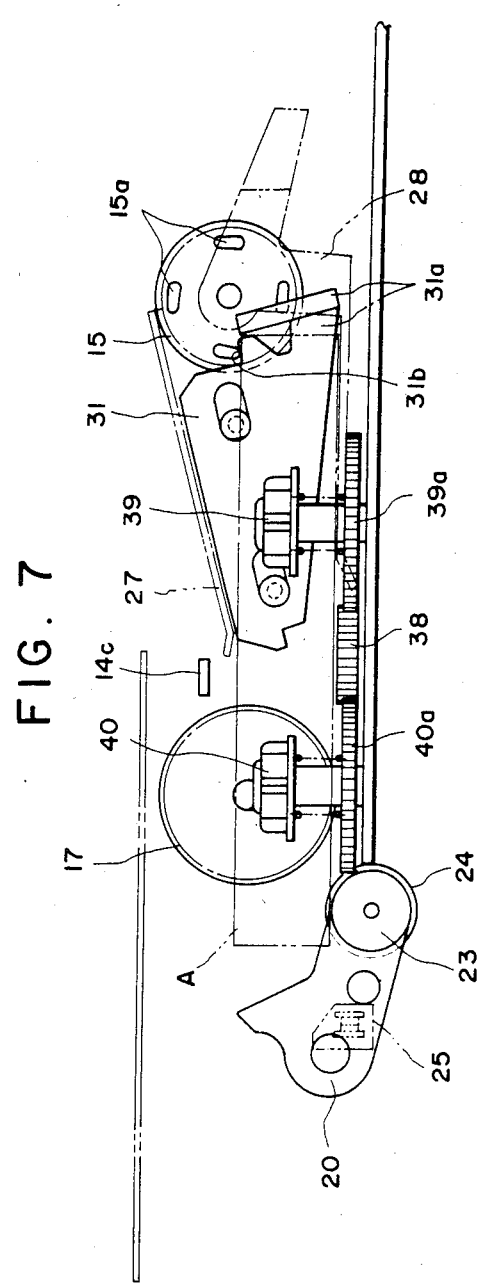

CASSETTE RECORDING/REPRODUCING APPARATUS WITH AN AUTOMATIC LOADING FEED ROLLER

BACKGROUND OF THE INVENTION

This invention relates to a cassette tape recording/reproducing apparatus, and more particularly, to a micro-cassette tape recording/reproducing apparatus capable of automatic loading of a micro-cassette casing.

Conventional micro-cassette tape recorders are provided with means for automatically carrying the cassette casing in place in the tape recorder, for example, in the form of a movable clawed member which is adapted to engage with a window in the cassette casing which is inserted through an inlet of the tape recorder. The clawed member engaging with the cassette casing is then moved inwardly by a motor or any other suitable drive means to thereby carry in the cassette casing above the reel bases. A loading plate positioned adjacent the top surface of the carried-in cassette casing is then forced down by means of a drive source such as a plunger to thereby bring the hubs in the cassette casing into mesh with the reel bases, completing the cassette loading operation. The cassette casing may be ejected by following the above procedures in a reverse sequence.

Another example uses a carrier provided in a cassette tape recorder for receiving a cassette casing therein. This carrier may be moved in a similar manner as above, thereby loading or ejecting the cassette casing into or from the tape recorder.

These automatic loading systems have the shortcoming that they are of relatively large size because the clawed member or carrier must be moved a considerable distance. The latter system is troublesome and time-consuming to assemble and thus expensive because the carrier requires a greater number of parts.

OBJECT OF THE INVENTION

It is an object of the present invention to provide a cassette tape recorder which uses a feed roller to carry the cassette casing into the apparatus.

Another object of the present invention is to provide a cassette tape recorder which uses a feed roller which is moved aside upon engagement with the cassette casing so that the cassette casing may be inserted through an inlet of the recorder in an easy and smooth manner.

A further object of the present invention is to provide a cassette tape recorder which uses a feed roller to carry the cassette casing into the apparatus, wherein the driving force is disconnected from the feed roller after the cassette casing has been carried in, thereby preventing the feed roller from being worn and the cassette casing from being stained.

A still another object of the present invention is to provide a cassette tape recorder which uses a feed roller to carry the cassette casing into the apparatus, wherein the feed roller is disposed adjacent a cassette inlet of the apparatus and on the lower side of the cassette casing being inserted to ensure smooth loading of the cassette casing.

A still further object of the present invention is to provide a cassette tape recorder of the above-described type wherein a motor is used to impart a rotational force to the feed roller when the cassette casing is carried into the apparatus by the feed roller and then used to drive the reel bases after the completion of cassette loading.

A further object of the present invention is to provide a cassette tape recorder which uses a feed roller which may be rotated in one and opposite directions to carry the cassette casing into and away from the interior of the recorder for cassette loading and ejecting operations.

SUMMARY OF THE INVENTION

According to the present invention, there is provided a cassette tape recording/reproducing apparatus of the automatic cassette loading type wherein a cassette casing inserted into a cassette inlet of the apparatus is automatically rested on reel bases. A frictional feed roller is disposed adjacent the cassette inlet and adapted to be forced down by the cassette casing being inserted. Drive means for imparting a rotational force to the feed roller includes a motor and a gear train interconnecting the motor to the feed roller. Control means responds to the forcing down of the feed roller to actuate the motor to rotate the feed roller, thereby frictionally carrying the cassette casing into the interior of the apparatus. Loading/unloading means includes a pair of loading and unloading plates pivoted on a shaft and serves to move down the cassette casing which has been carried in place by the feed roller, thereby resting the cassette casing on the reel bases in mating relationship. The gear train selectively interconnects the motor to the feed roller and to one of the reel bases, and in response to the resting of the cassette casing on the reel bases, the motor is disconnected from the feed roller and concurrently interconnected to one of the reel bases through the gear train.

BRIEF DESCRIPTION OF THE DRAWINGS

The above and other objects, features, and advantages of the invention will be more fully understood by reading the following description in conjunction with the accompanying drawings, in which;

FIG. 4 is a cross-sectional view taken along lines IV—IV in FIG. 2;

FIG. 5 is a cross-sectional view similar to FIG. 4, illustrating the cassette casing partially inserted;

FIG. 6 is a cross-sectional view similar to FIG. 4, illustrating the cassette casing further inserted;

FIG. 7 is a cross-sectional view similar to FIG. 4, illustrating the cassette casing fully loaded;

DESCRIPTION OF THE PREFERRED EMBODIMENTS

Figure 1:
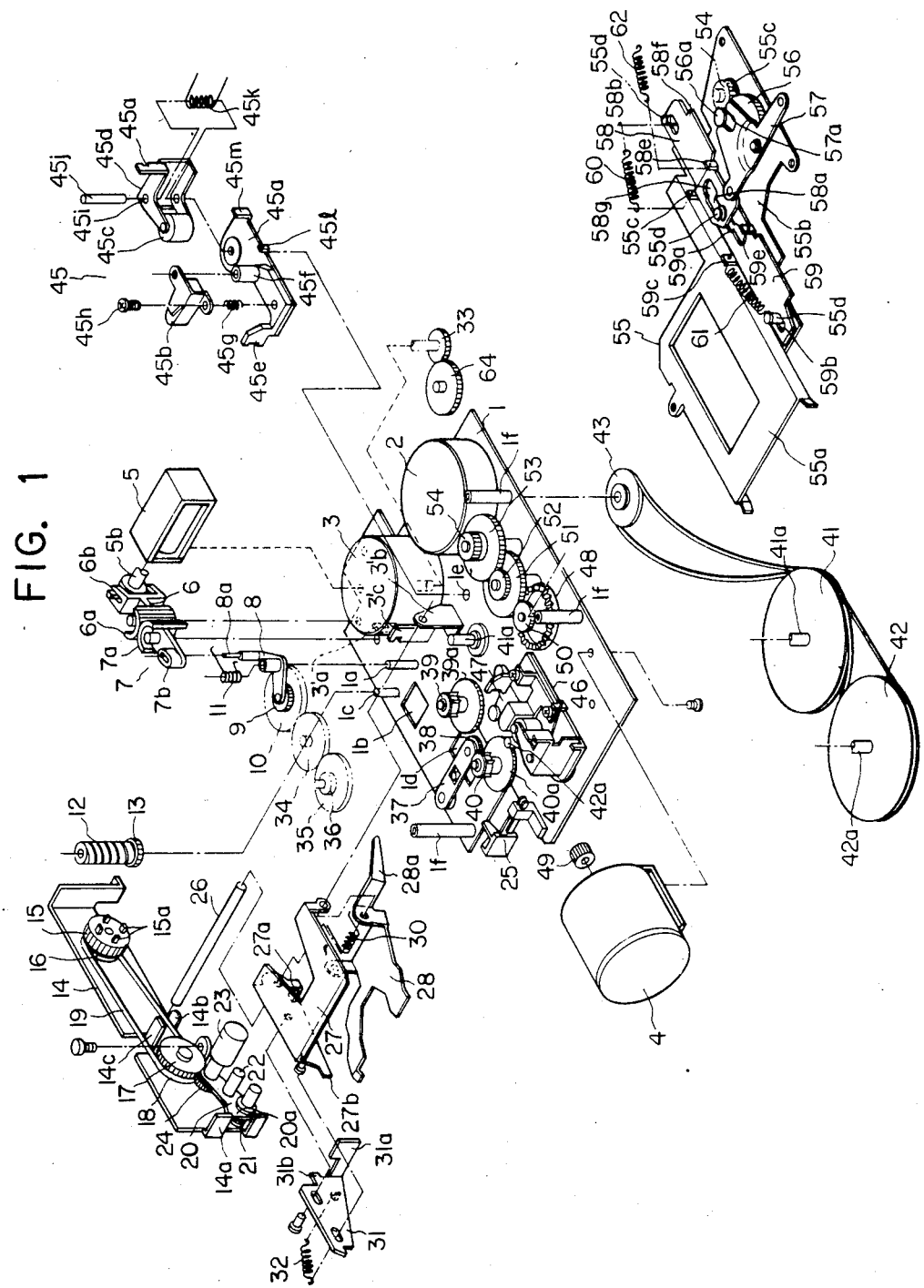
FIG. 1 is an exploded perspective view of one preferred embodiment of the cassette tape recording/reproducing apparatus according to the present invention.
Figure 2:
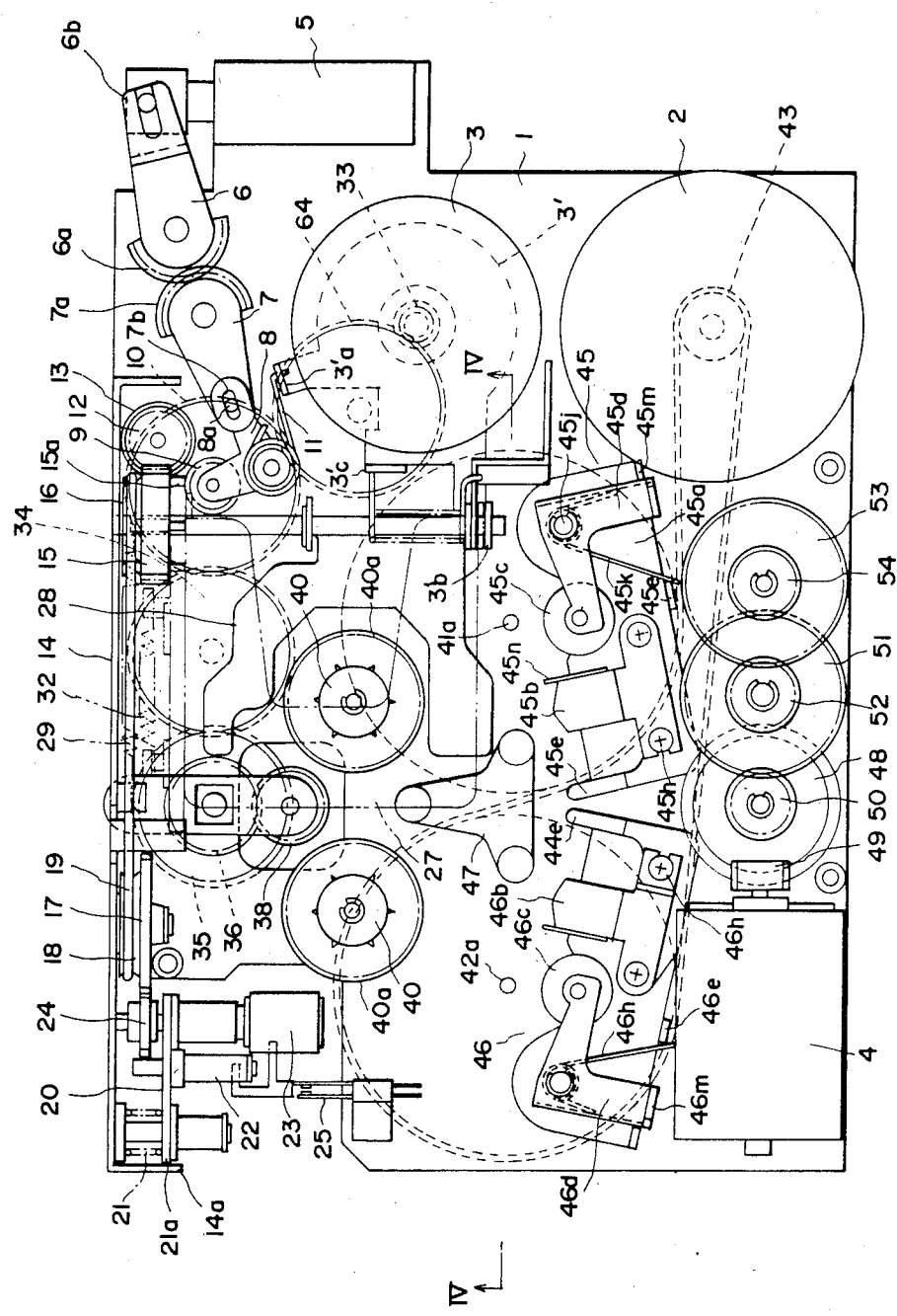
FIG. 2 is a plan view of the apparatus of FIG. 1 with the second chassis taken away.

In the following description in conjunction with the drawings, for convenience of description, the positional or directional terminology is used on the basis of the views of the figures, including upper, lower, left, right, clockwise, counterclockwise, and the like.

Referring to FIGS. 1–4, there is illustrated one preferred embodiment of a micro-cassette tape recording/reproducing apparatus comprising a first, substantially flat, rectangular chassis 1 (to be referred to simply as "chassis", hereinafter). On the chassis 1 are mounted a capstan drive motor 2, a reel crive motor 3, and a mechanism controlling motor 4. The reel motor 3 is mounted on the chassis 1 through an attachment member 3'. A solenoid 5 is secured to the upper right corner of the chassis 1 (in FIG. 2). A first segment gear 6 has at one end an arcuate toothed portion 6a and at the other end a cooperating fork 6b engaged with a suction rod 5a of the solenoid 5, and is pivoted at its intermediate to the chassis 1. A second segment gear 7 has at one end an arcuate toothed portion 7a in mesh with the first gear toothed portion 6a and at the other end a cooperating portion 7b engaged with a pin 8a on one end of a link 8, and is pivoted at its intermediate to the chassis 1. The link 8 is L-shaped and pivoted through its central bearing on a pin 1a on the chassis 1, and a double gear assembly consisting of a small gear 9 on a large gear 10 is pivoted to the other end of the L-shaped link. The large gear 10 is at the rear (or lower) side of the chassis 1 and the small gear 9 is projected through an opening 1b in the chassis 1 beyond the face (or upper) surface of the chassis. A spring 11 having a coiled portion fitted over the bearing of the link 8 is engaged at one end with the link 8 and at the other end with a tab 3'a on the motor attachment member 3' so that the link 8 is biased counterclockwise. Consequently, the second and first segment gears 7 and 6 are imparted clockwise and counterclockwise rotational forces, respectively. As a result, the solenoid 5 is kept with its suction rod 5a drawn out.

A worm gear 12 is journalled on a pin 1c on the chassis 1 and has an integral spur gear 13 at the lower end. When the solenoid 5 is energized to rotate the link 8 an angle, the small gear 9 is brought in mesh with the spur gear 13. A sub-chassis 14 whose main surface is perpendicular to that of the chassis 1 is fixedly secured to the chassis 1. A gear 15 is pivoted to the sub-chassis 14 and positioned in mesh with the worm gear 12. The gear 15 has an integral pulley 16 formed between the gear 15 and the sub-chassis 14, and is provided on its front surface with four projections 15a. Another gear 17 similar to the gear 15 and having a pulley 18 between the gear 17 and the sub-chassis 14 is also pivoted to the sub-chassis 14. An endless belt 19 is extended around these pulleys 16 and 18. A swing arm 20 is pivoted for rotation to the sub-chassis 14 and biased counterclockwise by a coil spring 21 fitted on the pivot. The swing arm 20 has a projection 20a which is in abutment with a folded tab 14a of the sub-chassis 14. A stud 22 is secured to an intermediate of the swing arm 20 so as to cooperate with a switch 25 when it is clockwise rotated a given angle against the action of the spring 21. A cassette casing feed roller 23 is pivoted to the tip of the swing arm 20 and has an integral gear 24 formed between the swing arm 20 and the sub-chassis 14 and adapted to mesh with the gear 18. The switch 25 is affixed to the chassis 1 and has contacts which are made or broken by means of the stud 22 when a cassette casing A is inserted until the cassette leading edge engages and depresses the feed roller 23 to thereby rotate the swing arm 20 clockwise against the action of spring 21. The switch 25 is designed such that it is kept off before insertion of the cassette casing A, turned on when the cassette casing A is inserted to rotate the swing arm 20 clockwise to thereby move down the stud 22 in contact with the switch 25, and then turned off again upon complete loading of the cassette casing A.

A shaft 26 is extended between the sub-chassis 14 and a support 3'b standing on the attachment plate 3'. On the shaft 26 are pivotally mounted loading and unloading plates 27 and 28. The loading and unloading plates 27 and 28 are opposed to each other and positioned in a path for a cassette casing A to advance past the feed roller 23. A spring 29 is extended between an extention 27a of the loading plate 27 and a projection 14b of the sub-chassis 14 to bias the loading plate 27 clockwise so that a stop 27b formed at the forward end of the loading plate 27 is in abutment with another projection 14c of the sub-chassis 14. The unloading plate 28 is also biased clockwise by a coil spring 30 fitted on the shaft 26. An extension 28a from the rear end of the unloading plate 28 is in abutment with the chassis 1, which serves to limit the angular displacement of the unloading plate 28. One end of the coil spring 30 is engaged with an upright piece 3'c on the motor attachment plate 3' while the other end is engaged with the extension 28a. The loading and unloading plates 27 and 28 and associated members are arranged such that the cassette casing A carried by the feed roller 23 enters between the loading and unloading plates from the left. A slidable control plate 31 is mounted for sliding motion on the side surface of the loading plate 27 and is biased forward or to the left by a spring 32 extended between the control plate 31 and the loading plate 27. The control plate 31 is provided at the rear end with a stop 31a adapted to abut the leading edge of the incoming cassette casing A and with a detent 31b adapted to engage any one of the projections 15a on the gear 15. The stop 31a of the control plate 31 extends between the loading and unloading plates 27 and 28.

On an output shaft of the reel drive motor 3 is attached a gear 33 which is in mesh with an idle gear 64 which is, in turn, in mesh with the above-mentioned large gear 10 under the lower surface of the chassis 1. It is to be noted that the gear 33 has magnetic N and S pole regions alternately magnetized along its circumference or light reflecting and non-reflecting regions alternately formed along its circumference, and rotation detector 70 in the form of a Hall element or photocoupler is pisitioned in proximity to the gear 33. Then the rotation detector 70 continues to generate pulse signals when the gear 33 is rotating, and generates an output signal at a given (high or low) level when the gear 33 is stopped.

Referring to FIG. 4, when the cassette casing A is inserted, the leading edge of the cassette casing engages and forces the feed roller 23 to rotate the swing arm 20 counterclockwise against the spring action, thereby causing the gear 24 to mesh with the gear 18 and the stud 22 to press the switch 25 to make its contacts. The solenoid 5 and the reel drive motor 3 are thus energized through a control circuit to be described later, and as a result, the solenoid suction rod 5a is withdrawn and the gear 33 begins rotating. Withdrawal of the suction rod 5a causes the arm 8 to be rotated clockwise against the spring action through the segment gears 6 and 7, bringing the small gear 9 in mesh with the spur gear 13. At this point, the gear 33 is kept in cooperation with the large gear 10 via the idle gear 64. Accordingly, the rotational force of the gear 33 is transmitted to the worm gear 12 through the idle gear 64, large gear 10, small gear 9, and spur gear 13, thereby rotating the gear 15. When the gear 15 is rotated, the gear 17 is rotated through the belt 19, and the feed roller 23 is rotated via the gear 24 in a direction for forward movement of the cassette casing A. Due to friction with the feed roller 23, the cassette casing A is moved forward between the loading and unloading plates 27 and 28. When the cassette casing A abuts at its leading edge against the stop 31a of the slidable control plate 31, the control plate 31 is moved forward against the action of the spring 32 to bring the detent 31b in engagement with one of the projections 15a on the gear 15. Then, the rotational force of the gear 15 is converted into a force of rotating the control plate 31 counterclockwise via the engagement of projection 15a with detent 31b. The loading plate 27 to which the slidable control plate 31 is attached is thus rotated counterclockwise about the shaft 26. The unloading plate 28 is also rotated counterclockwise by way of the cassette casing A interposed therebetween, so that the cassette casing A is moved down and seated on reel bases to be described later. That is, the cassette casing A is set ready in the tape recorder/player. At this point, a switch (not shown) is turned off to interrupt power supply to the solenoid 5. Then, the link 8 is rotated counterclockwise by the action of spring 11 and the segment gears 6 and 7 resume their initial positions and the large gear 10 is brought in mesh with an intermediate gear 34 to be described hereinafer. It is to be noted that power supply to the reel drive motor 3 is also temporarily interrupted at this point until a subsequent instruction signal is received.

The intermediate gear 34 is adapted to mesh with the large gear 10 when the solenoid 5 is not actuated. A double gear assembly consists of a large gear 35 which is in mesh with the intermediate gear 34 and a small gear 36 formed integral and concentric therewith. The small gear 36 is projected through an opening 1d in the chassis 1 beyond the upper surface of the chasis 1. A swing cantilever 37 is pivoted at one end to the chassis 1 and has a gear 38 pivoted at the other end on the lower surface. The gear 38 is in continuous mesh with the small gear 36. Reel bases 39 and 40 has toothed circumferences 39a and 40a with which the gear 38 selectively meshes.

When the reel drive motor 3 is actuated with the solenoid 5 de-energized and with the large gear 10 on the L-shaped arm 8 in mesh with the intermediate gear 34, the gear 38 pivoted to the cantilever 37 is rotated via the gear 33, idle gear 64, large gear 10, intermediate gear 34, large gear 35, and small gear 36. Depending on the rotational direction of the small gear 36, the cantilever 37 is swung to the left or right in FIG. 2 due to frictional engagement between the gears 36 and 38. In this manner, the gear 38 is brought in mesh with the toothed circumference 39a or 40a of the reel base 39 or 40. More particularly, when the small gear 36 is rotated clockwise, the gear 38 is rotated counterclockwise and the cantilever 37 is swung clockwise about its pivot so that the gear 38 is brought in mesh with the toothed circumference 40a of the reel base 40. When the small gear 36 is rotated counterclockwise, the gear 38 is brought in mesh with the toothed circumference 39a of the reel base 39. Accordingly, either of the reel bases 39 and 40 is rotated depending on the rotational direction of the reel drive motor 3.

41 and 42 designate flywheels pivoted to the rear or lower surface of the chassis 1. The rotating shafts of the flywheels 41 and 42 project beyond the upper surface of the chassis 1 and form capstan shafts 41a and 42a, respectively. A pulley 43 is secured to the output shaft of the capstan motor 2, and an endless belt 44 is trained around the pulley 43 and the flywheels 41 and 42. Thus, the capstan shafts 41a and 42a may be rotated by actuating the capstan motor 2.

A pair of pinch roller units 45 and 46 are located in association with the capstan shafts 41a and 42a, respectively. Only the right pinch roller unit 45 is described below. It will be evident that the same applies to the left pinch roller unit 46, and like parts are designated by numerals 45 and 46 to which like alphabets are attached. The pinch roller unit 45 comprises a base 45a made of a synthetic resin, a reproducing magnetic head 45b secured to the base, and a support frame 45d to which a pinch roller 45c is pivoted. More particularly, the base 45a has an integral tape guide 45e extended so as to face the central window in the cassette casing A for preventing the moving tape from vertically waving, and an integral boss 45f. The head assembly 45b is fixedly screwed at one end to the boss 45f and secured at the other end to the base 45a through a spring 45g by means of a screw 45h. The interposition of the spring 45g allows for azimuth adjustment of the head by turning the screw 45h. The support frame 45d which is L-shaped in plan view and U-shaped in cross section is provided at its center with apertures 45i through which a pin 45j is inserted for pivotal attachment of the frame. The lower end of the pin 45j is in press fit in an aperture 1e in the chassis 1. The pin 45j is also inserted through a coil spring 45k between the opposed walls of the frame 45d while one end of the coil spring 45k is engaged with the bottom end of the frame 45d and the other end is engaged with a projection 45l on the base 45a (see FIG. 2). The support frame 45d is biased counterclockwise by the spring 45k so that the bottom end of the frame 45d is in abutment with a stop 45m on the base 45a. Another tape guide 45n is attached to one side of the head assembly 45b. A triangular stop member 47 made of synthetic resin is positioned substantially central with respect to the reel bases 39 and 40 and the pinch roller units 45 and 46 for providing limits to the pivotal motion of the bases 45a and 46a. That is, when the bases 45a and 46a are rotated about the pins 45j and 46j by drive means to be described later, the bases abut stops at the apexes of the triangular stop member 47 so that they are restricted of rotation.

A bevel gear 48 having teeth formed on its upper circumference is in mesh with a gear 49 secured to the output shaft of the mechanism controlling gear 4. A small gear 50 is formed integral with the bevel gear 48, a large gear 51 is in mesh with the gear 50, a small gear 52 is formed integral with the large gear 51, a large gear 53 is in mesh with the small gear 52, and a small gear 54 is formed integral with the large gear 53. The last-mentioned small gear 54 is projected through an opening 55c in a second chassis 55 beyond the upper surface of the second chassis.

Figure 3:
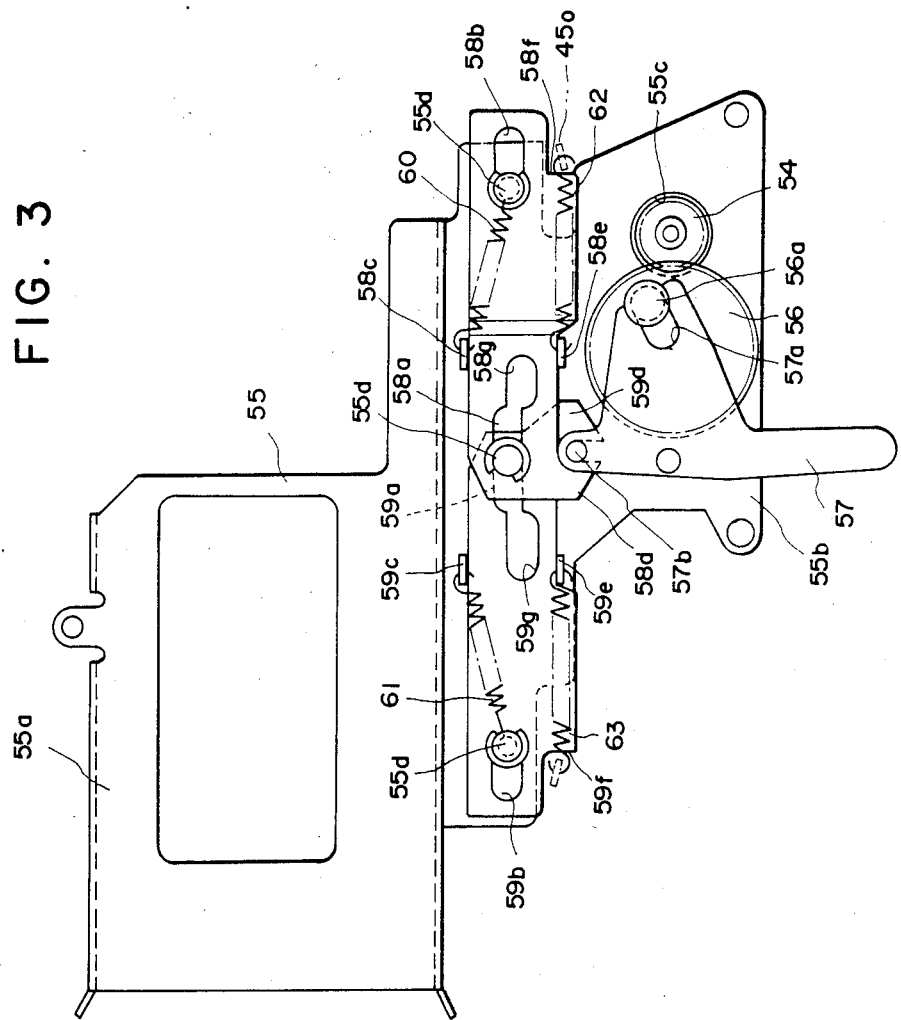
FIG. 3 is a plan view illustrating the pinch roller unit controlling mechanism on the second chassis.
Figure 8:
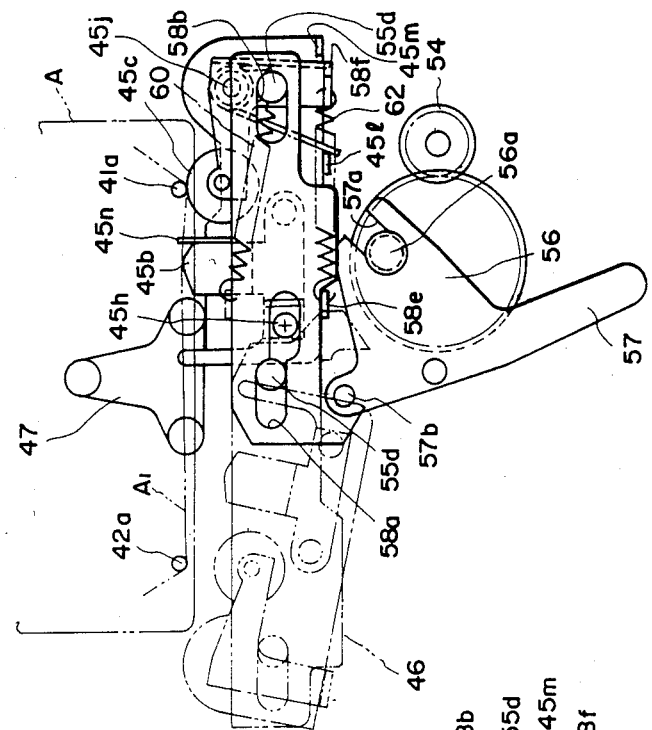
FIG. 8 is a plan view similar to FIG. 3, illustrating the components in the playback operation.

The second chassis 55 is screwed to three posts 1f embedded in the chassis 1 and includes a cassette guide section 55a for receiving a cassette casing, and an attachment section 55b to which members of a pinch roller unit control mechanism to be described later are attached. The cassette guide section 55a defines a cassette inlet at its left end through which the cassette casing is longitudinally inserted. The attachment section 55b is provided with the opening 55c, and a gear 56 is pivoted to this section so as to mesh with the small gear 54 projecting through the opening 55c. The gear 56 has a guide pin 56a formed integral therewith at a position off the center. A swing plate 57 is pivoted to the attachment section 55b and has a cut-out 57a engageable with the guide pin 56a on the gear 56. Elongated control plates 58 and 59 are located in partially overlapping relationship adjacent the attachment section 55b and provided with slots 58a, 58b, and 59a, 59b at opposed ends, through which three pins 55d are extended from the second chassis 55 as best shown in FIG. 3. The engagement of pins 55d with slots 58a, 58b, 59a, and 59b allows the control plates 58 and 59 to slide with respect to the second chassis 55. Springs 60 and 61 are extended between the outer pins 55d and the projections 58c and 59c on the control plates 58 and 59, respectively, to bias the control plates 58 and 59 in opposite directions. The mutually facing or overlapping ends of the control plates 58 and 59 are provided with jaws 58d and 59d engageable with a pin 57b at the inner end of the above-mentioned swing plate 57. When the gear 56 is rotated counterclockwise to rotate the swing plate 57 counterclockwise, the control plate 58 is moved to the left in FIG. 3 against the action of spring 60. On the contrary, when the gear 56 is rotated clockwise, the control plate 59 is moved to the right in FIG. 3 against the action of spring 61. The control plates 58 and 59 are further provided with projections 58e and 59e, and springs 62 and 63 are extended between the projections 58e and 59e and projections 45o and 46o on the support frames 45d and 46d of the pinch roller units 45 and 46, respectively. The frame projections 45o 46o are engaged with shoulders 58f and 59f of the control plates 58 and 59. Consequently, the support frame 45d is biased clockwise about the pin 45j by the action of spring 62 to the position limited by the engagement of frame projection 45o with control plate shoulder 58f. When the control plate 58 is slid to the left against the action of spring 60 as shown in FIG. 8 in the above-mentioned manner and the shoulder 58f is moved together to the left, the spring 62 imparts a clockwise rotational force to the support frame 45d to rotate the support frame 45d and the base 45a until the base 45a abuts the stop 47. At this point, the pinch roller 45c has not yet contacted the capstan shaft 41a while the head 45b is in contact with the tape A1. Since the control plate 58 continues to move after the base 45a has abutted the stop 47, the support frame 45d is further rotated clockwise about the pin 45j by the action of spring 62 overcoming the action of spring 45k, and the pinch roller 45c is eventually brought in contact with the capstan shaft 41a under the differential pressure between the forces of springs 45k and 62.

When the control plate 59 is slid, a series of operations similar to the above-described series of operations will take place. That is, the base 46a is rotated counterclockwise to bring the head 46b in contact with the tape A1, and the pinch roller 46c is brought in contact with the capstan shaft 42a under the differential pressure between the forces of the springs 46k and 63.

Figure 12:
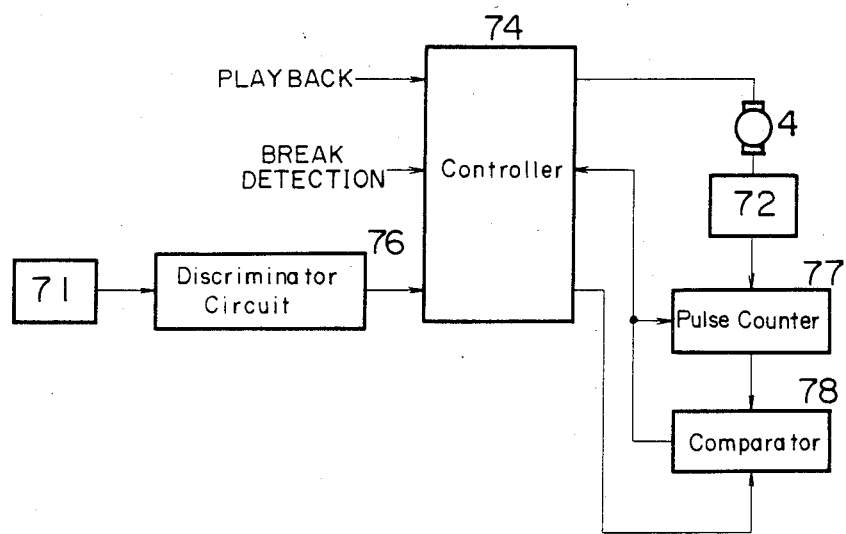
FIG. 12 is a block diagram of a control circuit for base movement controlling means.

Referring to FIG. 12, 71 designates means for detecting the position of the swing plate 57 when it is clockwise swung by means of the mechanism controlling motor 4 to the reverse playback position. The position detector means 71 may be composed of a combination of a magnet and a Hall element or a light emitting element and a sensor element which are vertically opposed with respect to the tip of the swing plate 57. During the reverse playback operation, the tip of the swing plate 57 blocks the magnetic field or radiation from one element of the detector means 71 so that the detector means 71 produces a low level output. During the forward playback operation, the tip of the swing plate 57 is moved outside the detector means 71, which produces a high level output.

72 designates a revolution detector for detecting the number of revolutions of the gear 54, and hence, of the mechanism controlling motor 4. The revolution detector 72 may be composed of a Hall element when the outer circumference of the gear 54 is magnetized or a photocoupler when the teeth of the gear 54 are alternately painted white and black, but not limited thereto. The revolution detector 72 produces output pulses in proportion to the number of teeth as the gear 54 rotates.

It should be noted that the control plates 58 and 59 includes access openings 58g and 59g communicating with the slots 58a and 59a. When the control plates 58 and 59 are longitudinally slid, the access openings 58g and 59g are aligned with the heads of the azimuth adjustment screws 45h and 46h so that the screws are accessible. In this aligned or accessible condition, the azimuth adjustment of the head 45b or 46b may be carried out.

The one ends of the springs 11 and 30 are engaged with the reel drive motor attachment plate 3' to apply spring forces to the attachment plate 3' in one direction (counterclockwise in FIG. 2) so that loosening of screws due to vibration caused by the motors is prevented, ensuring firm fastening of the motor 3 to the chassis 1.

In the illustrated embodiment, the mechanism for controlling the pinch roller units 45 and 46 are mounted on the second chassis 55 which is secured to the first chassis 1 by means of screws, while the pinch roller units 45 and 46 are assembled on the first chassis 1. Since the pinch roller units and the control mechanism can be separately assembled, there is obtained the advantage of ease of assembly.

Figure 10:
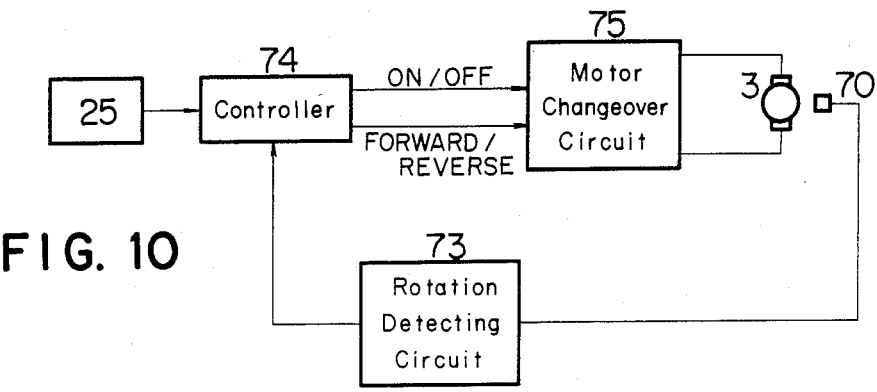
FIG. 10 is a block diagram of a control circuit for wrong loading preventing means.
Figure 11:
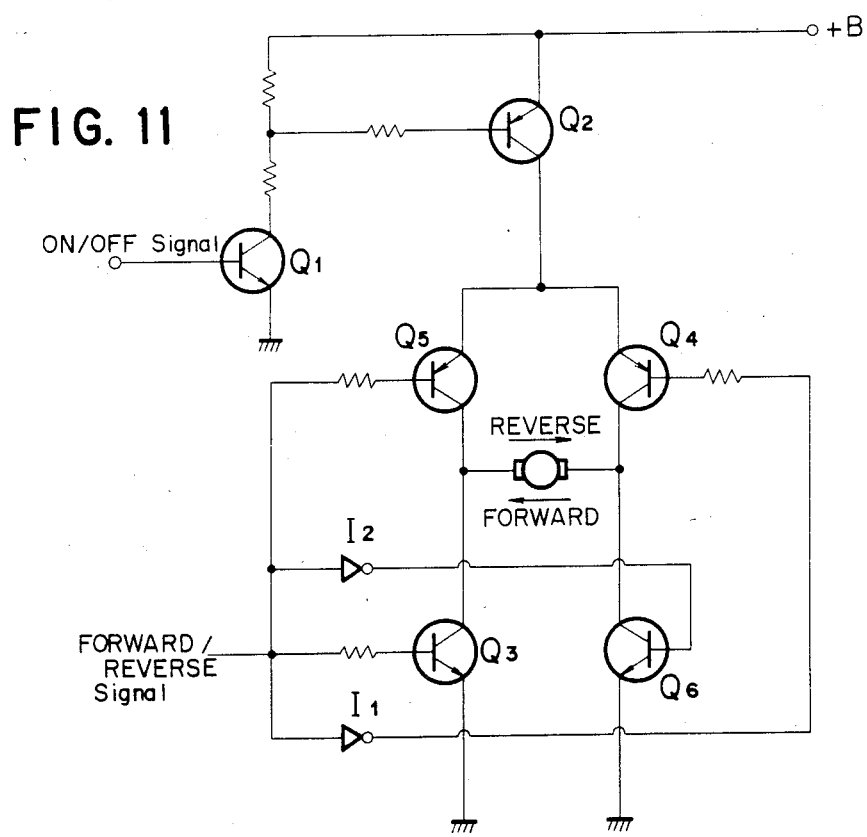
FIG. 11 is a circuit diagram of the motor rotational direction changing circuit used in the diagram of FIG. 10.

FIG. 10 and 11 show a control circuit for controlling the reel drive motor 3. In the block diagram shown in FIG. 10, a rotation detecting circuit 73 connected to the rotation detector 70 produces a signal representative of rotation when a revolution detector 70 detects the rotation of the motor 3, that is, the rotation of the gear 33 to produce pulse signals, and a signal representative of stop when the revolution detector 70 produces a signal of a given level (high or low level) by detecting the stop of the motor 3. A controller 74 has two inputs connected to the switch 25 and the rotation detecting circuit 73 and two outputs both connected to a motor changeover circuit 75 for changing the rotational direction of the motor 3. The controller 74 is designed such as to produce an on signal to cause the motor 3 to rotate in the forward direction when the switch 25 is turned on, and a reverse signal to reverse the rotational direction of the motor 3 when the motor 3 is stopped during the on duration of the switch 25.

The motor rotational direction changeover circuit 75 is illustrated in FIG. 11 as comprising a first transistor $Q_1$ connected to the controller 74 such that it is turned on upon receipt of an ON signal from the controller 74, a second transistor $Q_2$ connected to the first transistor $Q_1$ such that the second transistor is turned on at the same time as the first transistor, a third transistor $Q_3$ connected to the controller 74 such that it is turned on upon receipt of a positive signal instructing forward rotation from the controller 71, a fourth transistor $Q_4$ connected to the controller 74 through an inverter $I_1$ and to the second transistor $Q_2$ such that it is turned on through the inverter, a fifth transistor $Q_5$ connected to the controller 74 and the second transistor $Q_2$ such that it is turned on upon receipt of a negative signal instructing reverse rotation, and a sixth transistor $Q_6$ connected to the controller 74 through a second inverter $I_2$ such that it is turned on through the inverter.

When the controller 74 produces an ON signal and a positive signal instructing forward rotation to the motor changeover circuit 75, the transistors $Q_1$ and $Q_2$ are turned on and the transistors $Q_3$ and $Q_4$ are turned on to cause the motor 3 to rotate in the forward direction. When a negative signal instructing reverse rotation is fed to the changeover circuit 75, the transistors $Q_5$ and $Q_6$ are turned on to cause the motor 3 to rotate in the reverse direction. When the controller 74 produces an OFF signal, the transistors $Q_1$ and $Q_2$ are turned off to block current flow to the motor 3. That is, the motor 3 is stopped when the cassette casing A is fully inserted to release the switch 25 open.

Finally, FIG. 12 shows a circuit for controlling the movement of the head base.

A discriminator circuit 76 is connected to the swing plate position detector 71 for judging whether the playback direction is forward or reverse in response to a signal from the latter. More particularly, the discriminator circuit 76 judges that the playback direction is forward when the mechanism controlling motor 4 is rotating in accordance with a playback signal from the controller 74 and the position detector 71 produces no signal in the forward operation, that is, in the playback mode with no output from the position detector 71. The discriminator circuit 76 judges that the playback direction is reverse in the playback mode with an output from the position detector 71. A pulse counter 77 is connected to the revolution detector 72 and counts the number of pulses from the revolution detector 72 responding to the number of revolutions of the gear 54. A comparator 78 is connected to the pulse counter 77 for comparing an output of the pulse counter 77 with a present output of the controller 74 and produces an output to the controller 74 when both the outputs are equal. The pulse counter 77 is reset upon receipt of a coincident signal from the comparator 78.

Next, the operation of the cassette tape recording/reproducing apparatus with the above-described arrangement will be described.

Referring to FIG. 5, when the cassette casing A is inserted through the cassette guide 55a of the second chassis 55, the cassette casing leading edge engages the feed roller 23 to force it down to rotate the swing arm 20 clockwise against the action of spring 21, and then the actuator stud 22 depresses the switch 25 to close it. The solenoid 5 is energized upon closure of the switch 25, and the link 8 is rotated against the action of spring 11 through the segment gears 6 and 7 to bring the small gear 9 in mesh with the gear 13. Upon closure of the switch 25, the controller 74 produces both an ON signal and a positive signal instructing forward rotation to the motor changeover circuit 75, the reel drive motor 3 then rotates in the forward direction, the gear 33 rotates therewith, and the worm gear 12 is rotated through the small gear 9 and the gear 13. The gear 15 is then rotated, and the gears 17 and 24 are rotated through the belt 16. The feed roller 23 is thereby rotated to carry the cassette casing A inwardly due to friction therebetween. As the cassette casing A advances, it abuts the stop 31a of the control plate 31 to slide the control plate 31 against the action of spring 32, and then the detent 31 engages any one of the projections 15a on the gear 15 at the end of sliding movement of the control plate 31 as shown in FIG. 6. Since the gear 15 is being rotated counterclockwise at this point, the slidable control plate 31 is forced down, and the loading plate 27 attached to this control plate 31 is thus rotated counterclockwise about the shaft 26. Accordingly, the cassette casing A is forced down together with the loading plate 28 against the action of coil spring 30 and the hubs in the cassette casing A are mated with the reel bases 39 and 40 as shown in FIG. 7. Since the feed roller 23 is also moved down at this point, the gear 24 is released from the gear 17 and the feed roller 23 thus stops rotating.

At the end of downward movement of the cassette casing A, the switch 25 is turned off, then the solenoid 5 is de-energized and the controller 74 delivers an OFF signal. As a result, the motor changeover circuit 75 functions to block current flow to the reel drive motor 3. On the other hand, the capstan motor 2 is energized to rotate the flywheels 41 and 42 through the belt 44. The capstan shafts 41a and 42a thus rotate.

On the other hand, the mechanism controlling motor 4 is energized in response to a predetermined instruction signal or manual selection. It is now assumed that the mechanism controlling motor 4 is energized so as to rotate the gear 56 counterclockwise. That is, when an instruction signal is fed or manual operation is made such as to effect reverse playback operation (the tape is transported to the right), the swing plate 57 is rotated counterclockwise as shown in FIG. 8 to move the control plate 58 to the left against the action of spring 60 through the pin 57b. The leftward movement of the control plate 58 causes the base 45a of the pinch roller unit 45 to rotate clockwise about the pin 45j by the action of spring 62 until the base 45a abuts the stop 47. At this point, the head 45b is in contact with the tape $A_1$, and the tape guide 45n affixed to the head 45b and the tape guide 45e are inserted into the corresponding windows in the cassette casing A to guide the tape $A_1$ to prevent it from vertically waving. As the control plate 58 is further moved, the support frame 45d is rotated clockwise by the differential force between the sprinqs 45k and 62 to urge the pinch roller 45c in pressure contact with the capstan 41a with the tape $A_1$ interposed therebetween.

The reel drive motor 3 is again energized in this state. Since the large gear 10 is in mesh with the intermediate gear 34 at this point, the rotation of the reel drive motor 3 is transmitted to the large gear 35 through the gear 33, idle gear 64, large gear 10, and intermediate gear 34. The small gear 36 is rotated with the large gear 35, and the rotation is thus transmitted to the gear 38. The reel drive motor 3 rotates so as to drive the gear 38 counterclockwise, and the counterclockwise rotating gear 38 rotates the swing cantilever 37 counterclockwise. Accordingly, the gear 38 is brought in mesh with the toothed circumference 39b of the reel base 39 to rotate the reel base counterclockwise to take up the tape.

Above described are procedures from the loading of the tape recorder with the cassette casing A to the start of playback operation. Below is a procedure of detecting a break or unrecorded portion between adjacent recorded portions in the tape while effecting fast forward operation in the playback mode.

Figure 9:
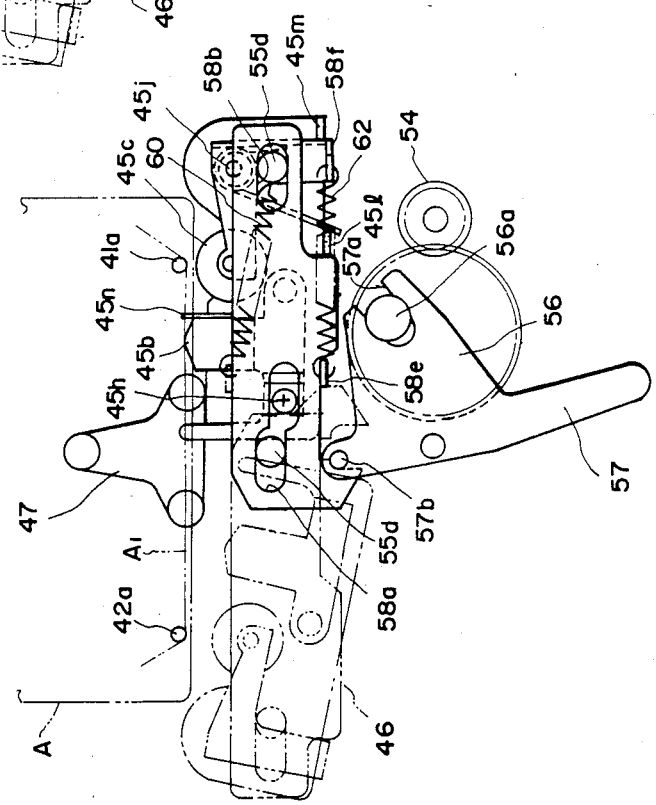
FIG. 9 is a plan view similar to FIG. 3, illustrating the components in the unrecorded portion detecting operation.

When a break detecting switch (not shown) is actuated, the controller 74 connected thereto functions ro rotate the mechanism controlling motor 4 in the opposite direction to that in the above-described operation. Since the controller 74 receives from the discriminator circuit 76 a signal indicative of the forward playback operation, the controller 74 judges the direction of the mechanism controlling motor 4 to be rotated, and delivers such an output. The mechanism controlling motor 4 is thus rotated and the gear 56 bigins to rotate, and the revolution detector 72 detects the number of revolutions of the gear 56 to generate corresponding pulses. The counter 77 counts these pulses and delivers corresponding signals to the comparator 78. At this point, the comparator 78 has received a predetermined number of signals from the controller 74 (this predetermined number allows the control plate 58 to be moved until the pinch roller 45c is released from the capstan shaft 41a while the head 45b is in sliding contact with the tape $A_1$). When the number of pulses from the counter 77 coincides with the predetermined number set by the controller 74, the comparator 78 produces a coincidence signal which causes the controller 74 to interrupt current flow to the mechanism controlling motor 4. Then the pinch roller 45b is released from the capstan shaft 41a while the head 45b is kept in sliding contact with the tape $A_1$. When the mechanism controlling motor 4 is reversed in rotation, the gear 56 is clockwise rotated a small angle, and the control plate 58 is thus moved to the right by the action of spring 60 to thereby rotate the base 45a counterclockwise a small angle. As a result, the pinch roller 45c is released from the capstant shaft 41a as described above, and the head 45b is kept in sliding contact with the tape $A_1$, providing for break detection. (see FIG. 9). When the head 45b detects a break, the mechanism controlling motor 4 is again energized, returning to the above-described playback operation.

For fast forward and rewind operations, the mechanism controlling motor 4 is reversely rotated, and the control plate 58 is returned to the original position, then the head 45b and the pinch roller 45c are released from the tape $A_1$ and the capstan shaft 41a, respectively. Then, the fast-forward or rewind operation may be carried out by rotating the reel drive motor 3 in the forward or reverse direction.

The foregoing description of various operations is made in connection with the reverse playback operation. Since the forward playback operation may be carried out in a similar manner except that the capstan motor 2, the mechanism controlling motor 4, and the reel drive motor 3 are reversed in rotation, the description of the forward playback operation is omitted.

Next, the operation of ejecting the cassette casing A will be described.

With the cassette casing A mated with the reel bases 39 and 40, the projection 15a on the gear 15 remains in engagement with the detent 31b and the gear 15 remains stationary. Although the gear 15 is imparted a clockwise rotational force by the spring 29 and the coil spring 30 in this condition, the meshing of the gear 15 with the worm gear 12 prevents the gear 15 from rotating. To eject the cassette casing, the solenoid is energized again to bring the gear 9 in mesh with the gear 13, and the controller 74 delivers both an ON signal and a negative signal instructing reverse rotation to cause the reel drive motor 3 to rotate in the opposite direction to the above case by way of the motor changeover circuit 73. As a result, the gear 15 is rotated clockwise, and the loading and unloading plates 27 and 28 are forced up by the action of spring 29 and coil spring 30 and by means of the projection 15a on the gear 15. While the cassette casing A is carried upward, the feed roller 23 is again raised to bring the gear 24 in mesh with the gear 17. As a result, the feed roller 23 is rotated in the reverse direction at this time to carry away the cassette casing A. When the cassette casing A is taken away, the switch 25 is made open through the actuator stud 22, and the controller 74 delivers an OFF signal to the motor changeover circuit 73 to de-energize the reel drive motor 3.

If the cassette casing A is wrongly inserted with its leading and trailing edges reversed, then the switch 25 is turned on as above to cause the reel drive motor 3 to rotate in the forward direction. The cassette casing A is advanced and then forced down at the end of advance. However, the hubs in the misoriented cassette casing A would not mate with the reel bases 39 and 40 and the capstant shafts 41a and 42a. The cassette casing A is stopped at a partially forced-down level due to obstruction by the reel bases 39 and 40 and the capstan shafts 41a and 42a. In this condition, the switch 25 still remains on and the power supply to the reel drive motor 3 is continued. However, as the cassette casing A is stopped midway in its downward movement, the motor 3 is stopped, which is detected by the revolution detector 70. The rotation detecting circuit 73 thus delivers a signal representative of motor stop. Then, the controller 74 delivers both an ON signal and a negative signal instructing reverse rotation to the motor changeover circuit 75, and the motor 3 is reversed in rotational direction. Then, the cassette casing A is lifted and then carried away in a similar manner to the above-described eject operation.

Although magnetic means in the form of a Hall element or optical means in the form of a photocoupler is used in the above-illustrated embodiment to detect the stop of the reel drive motor 3, such detection may, of course, be carried out by any other desired means, such as by detecting a variation in motor current.

The cassette tape recorder of the present invention is characterized by the use of a displaceable rotating feed roller which is driven by drive means to carry the cassette casing into the interior of the recorder, and disconnected from the drive means when the cassette casing has been carried in. The cassette casing is carried in between a pair of loading and unloading plates pivoted on a shaft and controlled by the same drive means. The cassette casing is thus loaded and unloaded into and from the recorder simply by rotating the same drive means in one and opposite directions, respectively. The recorder has the advantages of compact structure and smooth cassette loading. When wrongly inserted, the cassette casing is automatically ejected.

What is claimed is:

1. A cassette tape recording/reproducing apparatus of the automatic cassette loading type wherein a cassette casing inserted into a cassette inlet of the apparatus is automatically rested on reel bases, the improvement comprising a frictional feed roller disposed adjacent the cassette inlet and adapted to be forced down by the cassette casing being inserted, drive means for imparting a rotational force to said feed roller, and control means responding to the forcing down of said feed roller to actuate said drive means to rotate said feed roller, thereby frictionally carrying the cassette casing into the interior of the apparatus.

2. A cassette tape recording/reproducing apparatus according to claim 1 wherein said drive means includes a motor and a gear train interconnecting the motor to said feed roller.

3. A cassette tape recording/reproducing apparatus according to claim 1 which further comprises means for mechanically disconnecting said drive means from said feed roller when the feed roller has carried the cassette casing in place.

4. A cassette tape recording/reproducing apparatus according to claim 3 wherein said feed roller is pivoted to a free end of a spring biased swing arm and has a coaxial gear, and said drive means includes an outlet gear, whereby said coaxial gear is free of said outlet gear when the feed roller is free, brought in mesh with said outlet gear when the cassette casing forces down the feed roller to align said swing arm with said outlet gear, and then disconnected from said outlet gear when the cassette casing further forces down the feed roller.

5. A cassette tape recording/reproducing apparatus of the automatic cassette loading type wherein a cassette casing inserted into a cassette inlet of the apparatus is automatically rested on reel bases, the improvement comprising a frictional feed roller disposed adjacent the cassette inlet and adapted to be forced down by the cassette casing being inserted, drive means for imparting a rotational force to said feed roller, said drive means rotating said feed roller to thereby frictionally carry the cassette casing in place into the interior of the apparatus, and loading/unloading means for moving down the cassette casing which has been carried in place by said feed roller, thereby resting the cassette casing on the reel bases in mating relationship.

6. A cassette tape recording/reproducing apparatus according to claim 5 wherein said drive means comprises a motor and a gear train for selectively interconnecting the motor to said feed roller and to one of the reel bases.

7. A cassette tape recording/reproducing apparatus according to claim 6 which further comprises means for detecting the resting of the cassette casing on the reel bases and disconnecting said motor from said feed roller and concurrently interconnecting said motor to one of the reel bases through said gear train.

8. A cassette tape recording/reproducing apparatus according to claim 7 wherein said detection means functions to actuate another motor associated with capstans to thereby rotate the capstans by detecting the resting of the cassette casing on the reel bases.

9. A cassette tape recording/reproducing apparatus according to claim 6 which further comprises changeover means associated with said motor and responsive to an eject instruction signal to reverse the rotation of said motor, thereby allowing said loading/unloading means to move up the cassette casing which has rested on the reel bases, and rotating said feed roller in the opposite direction to carry away the cassette casing from the interior to the inlet of the apparatus.

10. A cassette tape recording/reproducing apparatus of the automatic cassette loading type wherein a cassette casing inserted into a cassette inlet of the apparatus is automatically rested on reel bases, the improvement comprising a slidable control plate adapted to engage the cassette casing inserted into the cassette inlet and be slid as the cassette casing is carried into the interior of the apparatus, rotational drive means engageable with said slidable control plate when said control plate is slid to the end, and loading/unloading means to which said slidable control plate is slidably attached, whereby said rotational drive means rotates said loading/unloading means through said control plate engaged, thereby moving down the cassette casing to rest on the reel bases.

11. A cassette tape recording/reproducing apparatus according to claim 10 wherein said loading/unloading means includes a shaft extending perpendicular to the diredtion of insertion of the cassette casing, and a pair of loading and unloading plates pivoted on said shaft and located to sandwich the cassette casing inserted through the inlet, whereby after the cassette casing is carried in place between said loading and unloading plates, the loading plate is rotated about said shaft from an initial position to a position substantially parallel to the reel bases to thereby move down the cassette casing and the unloading plate to rest the cassette casing on the reel bases, and the cassette casing is ejected by rotating said unloading plate about said shaft from the parallel position to the initial position to move up the cassette casing.

12. A cassette tape recording/reproducing apparatus of the automatic cassette loading type wherein a cassette casing inserted into a cassette inlet of the apparatus is automatically rested on reel bases, the improvement comprising a frictional feed roller disposed adjacent the cassette inlet and adapted to be forced down by the cassette casing being inserted, drive means for imparting a rotational force to said feed roller, said drive means rotating said feed roller to thereby frictionally carry the cassette casing in place into the interior of the apparatus, a slidable control plate adapted to engage the cassette casing inserted into the cassette inlet and be slid as the cassette casing is carried in by said feed roller , and loading/unloading means to which said slidable control plate is slidably attached, said loading/unloading means functioning to move down the cassette casing to rest on the reel bases in mating relationship after said control plate is slid to the end.

13. A cassette tape recording/reproducing apparatus according to claim 12 which further comprises interlocking means cooperating with said drive means and engageable with said slidable control plate when said control plate is slid to the end, whereby said interlocking means serves to rotate said loading/unloading means through said control plate engaged, thereby moving down the cassette casing to rest on the reel bases.

14. A cassette tape recording/reproducing apparatus according to claim 12 wherein said loading/unloading means includes a shaft extending perpendicular to the direction of insertion of the cassette casing, and a pair of loading and unloading plates pivoted on said shaft and located to sandwich the cassette casing inserted through the inlet, whereby after the cassette casing is carried in place between said loading and unloading plates, the loading plate is rotated about said shaft from an initial position to a loading position substantially parallel to the reel bases to thereby move down the cassette casing and the unloading plate to rest the cassette casing on the reel bases.

15. A cassette tape recording/reproducing apparatus according to claim 14 which further comprises means associated with said loading plate for disconnecting said drive means from said feed roller when said loading plate is rotated to rest the cassette casing on the reel bases.

16. A cassette tape recording/reproducing apparatus according to claim 14 wherein said drive means includes a motor and a gear train interconnecting the motor to said feed roller.

17. A cassette tape recording/reproducing apparatus according to claim 16 wherein said loading plate is spring biased to the initial position, and said gear train includes a drive gear for driving said loading plate, and a worm gear in mesh with said drive gear and driven by said motor, said worm gear preventing said loading plate from being returned to the initial position by the spring force.

18. A cassette tape recording/reproducing apparatus according to claim 14 wherein said drive means includes a motor and a gear train for selectively interconnecting the motor to said feed roller and to one of the reel bases.

19. A cassette tape recording/reproducing apparatus according to claim 18 wherein said gear train includes a drive gear having a plurality of projections on its main surface, and a worm gear in mesh with said drive gear and driven by said motor, said slidable control plate has a detent engageable with one of said drive gear projections when said control plate is slid to the end, whereby the driving force of said motor is transmitted to the loading plate via the worm gear, drive gear, projection, and control plate, and said worm gear prevents said loading plate from being returned to the initial position by the spring force when the worm gear is disconnected from said motor.

20. A cassette tape recording/reproducing apparatus according to claim 1, 5, 10 or 12 which further comprises a pinch roller unit including a base pivoted to a chassis, a magnetic head secured to the free end of the base, and a pinch roller assembly on the base, a control motor, means for cooperating said pinch roller unit with said control motor to provide controlled pivotal movement of said base, and a stop member secured to the chassis and disposed to engage the base being moved forward to stop it at a given position, wherein the pinch roller unit is advanced from an initial state to a first state where the base is in engagement with the stop member and the head is in contact with the tape by rotating the control motor in one direction, advanced from the first state to a second state where the pinch roller is in pressure contact with the capstan shaft by further rotating the control motor in one direction, and returned from the first and second states to the initial state by rotating the control motor in the opposite direction.

21. A cassette tape recording/reproducing apparatus according to claim 20 wherein the apparatus is of the automatic reverse operation type which includes a pair of the pinch roller units, wherein each of the heads is adjustably secured to the base by an azimuth adjustment screw, said cooperating means includes a pair of partially overlapped control plates for controlling the alternate movement of the pinch roller units, each of said control plates is perforated with an access opening which is positioned such that the opening is aligned with the azimuth adjustment screw only when the control plate is moved so as to advance the corresponding head and the opening is not aligned otherwise.

22. A cassette tape recording/reproducing apparatus according to claim 21 wherein said base is provided at the free end with a tape guide such that when the base is pivotally moved to introduce the head into the corresponding window in the cassette casing, the tape guide is also introduced into the center window in the cassette casing for guiding the tape.

23. A cassette tape recording/reproducing apparatus according to claim 20 wherein said cooperating means includes first and second mechanisms having first and second gears, respectively, the first mechanism is attached to the chassis, and the second mechanism is attached to a second chassis, the second chassis is secured to the chassis such that the first gear meshes with the second gear, whereby the first mechanism is interlocked with the second mechanism to form an integral mechanism.

24. A cassette tape recording/reproducing apparatus according to claim 20 wherein a motor is secured to an attachment member which is screwed to the chassis, the attachment member is provided with an engaging piece, one end of a spring included in any mechanism of the apparatus is engaged with said engaging piece to spring bias said attachment member in one direction to prevent it from being loosened.

25. A cassette tape recording/reproducing apparatus according to claim 6 which further comprises rotation detecting means for detecting whether or not said motor is rotating, switch means for detecting that the cassette casing is being loaded, and a control circuit for reversing the rotation of said motor when said switch means detects that the cassette casing is being loaded and said rotation detecting means detects that said motor is stopped or approximately stopped, thereby preventing wrong insertion of the cassette casing.

* * * * *